APPARATUS FOR ARRANGING SUBSTANTIALLY LAMINAR ARTICLES INTO SPACED GROUPS

Original Filed Nov. 30, 1970 4 Sheets-Sheet 1

Inventor
Jacob Salomon
By Spencer & Kaye
Attorneys

Inventor
Jacob Salomon
By Spencer & Kaye
Attorneys.

Inventor
Jacob Salomon
By Spencer & Kaye
Attorneys

Inventor
Jacob Salomon
By Spencer & Kaye
Attorneys.

United States Patent Office

Re. 27,765
Reissued Oct. 2, 1973

27,765

APPARATUS FOR ARRANGING SUBSTANTIALLY LAMINAR ARTICLES INTO SPACED GROUPS

Jacob Salomon, 10 Weizman Square, Holon, Israel

Original No. 3,662,875, dated May 16, 1972, Ser. No. 93,736, Nov. 30, 1970. Application for reissue June 21, 1972, Ser. No. 264,976
Int. Cl. B65g *15/00*
U.S. Cl. 198—180 15 Claims

Matter enclosed in heavy brackets [ ] appears in the original patent but forms no part of this reissue specification; matter printed in italics indicates the additions made by reissue.

ABSTRACT OF THE DISCLOSURE

A counting mechanism in which a stream of articles passing along a guide are interposed with regularly arranged spacer fingers which expand to bunch up the articles into discrete separated groups prior to delivery at for example a boxing station. Expansion of the fingers may be effected by causing the fingers to travel in pairs, one finger of each pair being driven by a first conveyor, and the other finger of each pair being slidably connected thereto and conducted by a second, slower moving conveyor.

The present invention relates to an apparatus for arranging substantially laminar articles into spaced groups, and in one form of the invention the apparatus is constructed to sort limp articles such as tea bags into groups which may then be packaged.

According to the present invention there is provided a counting mechanism comprising a guide, means for feeding along said guide a plurality of articles to be counted, a plurality of spacer fingers movable along said guide, and means for effecting relative movement between the fingers to define groups of articles travelling along the guide. Preferably at least one pair of spaced fingers is provided, and the movement-effecting means comprises means for separating the fingers of the or each pair. In such an arrangement the individual articles are delivered in a regular stream onto the guide and the spacer fingers pass along the guide plate in a timed relationship with the feed of articles so as to separate regularly sized groups of articles, the spacer fingers being arranged to bunch up the enclosed groups of articles during passage along the guide plate.

Advantageously the spacer fingers may be arranged in pairs, one finger of a pair being driven at a predetermined speed, and the other finger being movable with respect thereto by means of a finger separating mechanism. Conveniently the finger separating mechanism may comprise at least one bar arranged to move along the direction of the guide at a velocity less than that of the or each associated driven finger, the or each relatively movable finger being provided with an abutment surface which engages the separating bar to retard the finger and effect separating movement of the movable finger and the driven finger of the pair. Desirably a plurality of bars and pairs of fingers may be provided, the driven finger being driven by a first conveyor and the bars being driven by a second conveyor moving at a speed slower than that of the first conveyor.

It may be desirable for each driver finger to be secured to the first conveyor by being mounted between a pair of arms which are pivotally attached to an associated pintle extending between two spaced chains forming the first conveyor. Guide means may be provided for controlling the angular orientation of the arms during movement along upper and lower runs of the first conveyor.

Conveniently said guide means may comprise a peg mounted on one finger of each pair, and a network of strips fixed to a main frame of the machine and arranged to co-operate with the said peg.

Desirably the fingers of the or each pair are each in the form of L-shaped plates so that contacting limbs of the L-shaped plates are relatively slidable to effect separation of the other limbs of the plates. The slidably interconnected fingers of the pair may be bowed between friction pins extending across the gap between the arms in such a way that sliding movement between the fingers is frictionally resisted.

Advantageously the two conveyors may execute an intermittent motion including regularly occurring retardations, and the L-shaped fingers are introduced at the input end of the guide by a pivoting action which coincides with a retardation of the conveyors. In one particularly convenient form of the invention the two conveyors may be driven so as to experience a slight reversal of motion during each retardation, and a reciprocating mechanism engages the said contacting limbs of the L-shaped fingers and causes them to pivot in a direction lifting the said other limbs of the fingers upwardly past the input end of the guide so that upon ensuing acceleration of the conveyors the said other limbs are positioned above the guide. Suitably said other limbs of the fingers may each comprise wide upper portions integrally formed with narrow lower portions, and the guide may comprise a guide channel having a floor and at least one side wall, the floor being provided with a longitudinally extending slot greater than the width of the said narrow finger portions but less than the width of the said wide finger portions. The conveyors may be driven by an intermittent drive mechanism comprising co-axial driving and driven members and a stationary cam having a substantially circular periphery interrupted by a sharp lobe. The driving member may carry a pivotally movable arm provided with a pin which engages snugly in a slot of the driven member, and the arm further may include a cam follower roller arranged to roll along the periphery of said stationary cam with the result that during rolling movement of the cam follower roller the arm is caused to undergo sudden pivoting in a direction to retard the driven member and impart thereto an irregular motion during continuous motion of the driving member.

Desirably the said reciprocating mechanism may comprise a rotatable cam having a peripherally disposed cam surface, and a lever which is pivotally mounted on a stationary frame component and is provided with a pin for contacting the fingers, and also a cam follower roller on said lever for riding along said peripherally disposed cam surface. The lever may be spring biased for movement in a direction holding the cam follower roller in contact with the cam surface, and the peripherally disposed cam surface may be substantially circular apart from a lobe formed by an indent in the cam surface, the cam follower roller entering the indent under the action of the biasing spring and thereby causing the lever to pivot in a sense which corresponds to upward movement of the pin in contact with the associated finger assembly. Advantageously the pin may abut one of a pair of abutment strips carried by an arm of a pair, the two abutment strips forming a parallel-sided slot having a funnel shaped opening at one end, the conveyors and the pin being arranged so that the arm and associated abutment strips are moved towards the pin in a direction tending to cause the pin to enter the funnel shaped slot entrance, whereafter the pin may move upwardly to raise the fingers.

Timing of the operation of the conveyor retarding mechanism and the arm lifting mechanism may be achieved by mounting the rotatable cam of the lifting mechanism fixedly on a collar secured to, and preferably integrally formed with, the driving sprocket of the conveyor retarding mechanism.

Suitably means may be provided for restoring the fingers of the or a pair to a non-separated condition. The finger restoring means may advantageously comprise a spring detent arranged to urge the or each slidable finger back towards the associated driven finger during return of the fingers towards the input end of the guide. Alternatively the finger restoring means may conveniently comprise a further conveyor carrying a pin which moves at a speed slower than that of the fingers and along a path the same as that of the fingers as they return towards the input end of the guide. Said further conveyor may more conveniently include one run parallel to and substantially coincident with the path of the conveyor which drives the driven fingers, and also the further conveyor is mounted on sprockets at least one of which is driven by a chain wheel of larger diameter and engaging with the chain of the finger driving conveyor.

The invention also provides a tea bag packaging apparatus comprising the above counting mechanism, a starwheel for feeding tea bags to the guide of the counting mechanism and means for placing each group of counted tea bags in a box.

In order that the present invention may more readily be understood, the following description is given, merely by way of example, reference being made to the accompanying drawings in which.

Figure 1:
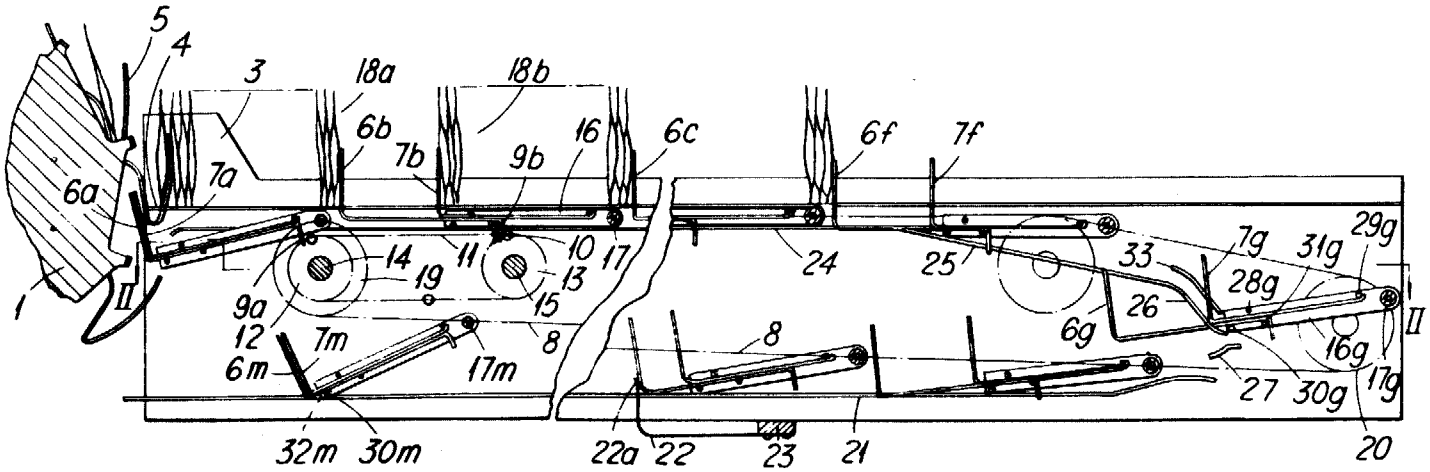
FIG. 1 is a side sectional view, taken on the line I—I of FIG. 2, and showing a device for arranging tea bags in rows for packaging, the device being constructed in accordance with the present invention.

Referring now to the drawings, FIG. 1 shows a star wheel 1 delivering tea bags individually onto the left hand end of a guide channel 3 provided with a pair of extractor teeth 4 which project into the space between wing members 5 defining pockets of the star wheel thereby removing the tea bag from the associated pocket and causing it to rest on the extractor teeth 4. Successive pairs of wing elements 5 moving downwardly past the left hand end of the guide channel urge the previously deposited bags along the channel in a rightward direction to form a stack which is progressively moved along the channel.

Movement of the bags rightwardly along the channel is assisted by means of pairs of L-shaped fingers elements 6a, 7a, 6b, 7b etc., in a manner to be described shortly. The pairs of finger elements move in a clockwise direction along a closed conveyor path defined by a pair of spaced conveyor chains 8 in such a way that the fingers 7 precede the fingers 6 along the top run of the conveyor path and then follow the fingers 6 during travel along the bottom run of the conveyor path. The trailing fingers 6 have, at their front ends, downwardly extending tabs 9a, 9b, etc., which engage behind abutment bars 10 on a second conveyor chain 11 which is arranged to pass around a pair of horizontally spaced sprockets 12 and 13 mounted on shafts 14 and 15 respectively. The leading and trailing fingers 7 and 6 respectively of each pair are slidably attached to each other and the leading finger 7 is fixed to two arms 16 fastened to the associated rotatable pintle 17 which supports the finger assembly on the conveyor chain 8. Throughout the specification the leading fingers 7 are described as driven fingers while the trailing fingers 6 are referred to as relatively movable fingers.

The upper run of conveyor chain 11 is arranged to move rightwardly at a velocity less than that of the upper run of the conveyor chains 8 so that, during that part of the movement of the finger assembly in which the tabs 9 are positioned rearwardly of and in abutment with the abutment bars 10, the trailing finger 6 will be retarded, as shown at 6b in FIG. 1, to separate the fingers 6b and 7b and thus bunch together the group of bags 18a which follows the trailing finger 6b. The next preceding group of bags 18b can be seen to be tightly held between the leading fingers 7b of one pair and the trailing finger 6c of the preceding pair and the various bags of the group are thus held in an upright evenly distributed relationship.

The particular star wheel assembly shown in FIG. 1 is that described in Dutch patent application No. 6,813,491, to which star wheel the bags are introduced in the form of a web of welded bags suspended in a catenary, one edge of the catenary being positioned at the point of infeed to the star wheel. During passage around the star wheel the bags are severed and individual bags are then moved radially outwardly and retarded in their circular motion prior to being deposited on the extractor teeth 4. It has been found that this particular arrangement provides a set of tea bags in which the contents have been uniformly distributed across the extent of the bag since the effect of gravity on the contents of the bag is reversed as the bags pass from the descending part of the catenary to the ascending part on the opposite side. Conventional tea bag producing machines suffer from the disadvantage that the contents of the bag are frequently bunched up at one edge of the bag to form a wedge shaped mass of tea. Thus the star wheel of my said co-pending British patent application is particularly convenient for use with the illustrated tea bag arranging system shown in FIG. 1. Of course, any other suitable tea bag feeding arrangement may be employed to deposit the bags at the left hand end of the guide channel 3 in the counting mechanism of the present invention. When employing any other conventional bag feeding device, the "bunching" effect exerted on the bags by the co-operating pairs of fingers such as 7b and 6c will tend to eliminate the disadvantageous wedge-shaped settling of the tea. One such other form of bag feeding arrangement is that described and illustrated in British patent specification No. 1,097,-842.

Once the tabs 9 move rightwardly beyond the right hand end of the upper run of conveyor chain 11 and thus out of the area of influence of the abutment bars 10, the spacing of the two fingers 6f, 7f of a pair is maintained since the slidable interconnection between the fingers has built-in frictional resistance which will resist any tendency for the bags grouped behind the trailing fingers to collapse outwardly and urge the trailing finger forwardly.

Figure 3:
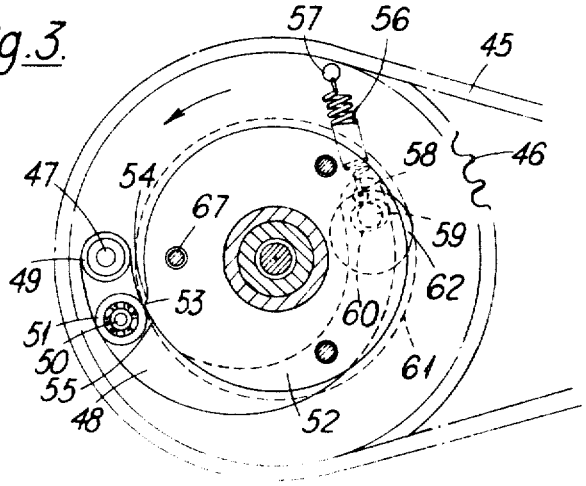
FIG. 3 is a section taken on the line III—III of FIG. 2.

The conveyor chains 8 are driven for an intermittent clockwise motion about associated sprockets 19 and 20, the lefthand sprocket 19 of which is driven by means of a suitable mechanism illustrated in FIG. 3. The circulation of the chain about the sprockets is influenced by the motion of lefthand sprocket 19 which is driven in the anti-clockwise sense as viewed in FIG. 3 to execute a mean clockwise angular motion interrupted intermittently by cyclic reversals of motion in which the sprocket is retarded rapidly and reverses slightly and then undergoes a more gentle acceleration back to the original mean anti-clockwise speed. The mechanism for creating this effect will be described more fully with reference to FIG. 3.

As the pairs of fingers 6 and 7 move leftwardly along the lower run of the conveyor chains 8, the right angle bend of the L-shaped movable fingers 6 which now lead the driven fingers 7 is able to slide along a lower guide member 21 and thus the orientation of the arms 16 is maintained at a small angle of inclination below the horizontal.

In this embodiment of the invention the spaced fingers 6 and 7 are caused to close by means of impact of the movable fingers 6 against an upwardly extending limb 22 of an L-shaped leaf spring secured to the machine frame at 23 and positioned in the path of the fingers to engage the respective movable fingers 6 and push them rearwardly into contact with the associated driven fingers 7. The extent to which the spring limb 22 protrudes into the path of movement of the fingers 6 and 7 is related to the angle of inclination of the respective arm 16 at that point so that the projecting finger 6 will extend downwardly below the end of the driven finger 7 and, after closing movement of the relatively movable finger 6, the two fingers 6 and 7 may ride up over a down-turned end 22a of the spring limb and travel past the spring without hindrance. An alternative form of closing mechanism will be described below with reference to FIG. 5.

Guide members for the arms 16 are also provided along the upper run of the conveyor chains 8 in the form of the upper substantially horizontal guide 24 the right hand of which merges into a downwardly inclined guide portion 25 which in turn has a steeply inclined end 26 allowing the arm to fall onto a further guide member 27 which supports the arm at the beginning of its leftward travel before allowing the arm to fall onto a bottom guide 21.

The guiding action of the various guide members 21, 24, 25, 26 and 27 is possible by virtue of the existence of the transversely extending pins associated with the arms. Each finger assembly, for example 6g and 7g is associated with two arms, only one of which 16g is shown in FIG. 1. The arms are positioned one on each of twin chains 8 and between which chains the rotatable pintles 17 are mounted, and the arms are linked by two upper transversely extending pins 28g and 29g and two lower transversely extending pins 30g and 31g. The finger 7g is secured to the upper pin 29g disposed closest to the pintle 17g, for example by welding, and the remaining upper pin 28g is arranged to coincide with the apex of an isosceles triangle having the lower pins 30g and 31g at opposite ends of its base. The relationship of the three pins 28g, 30g and 31g is such that a slight bowing action is exerted on the two contacting parallel finger portions extending therebetween and it is this bowing action which causes the above-mentioned frictional resistance to relative sliding motion on the part of the fingers 6 and 7.

Figure 2:
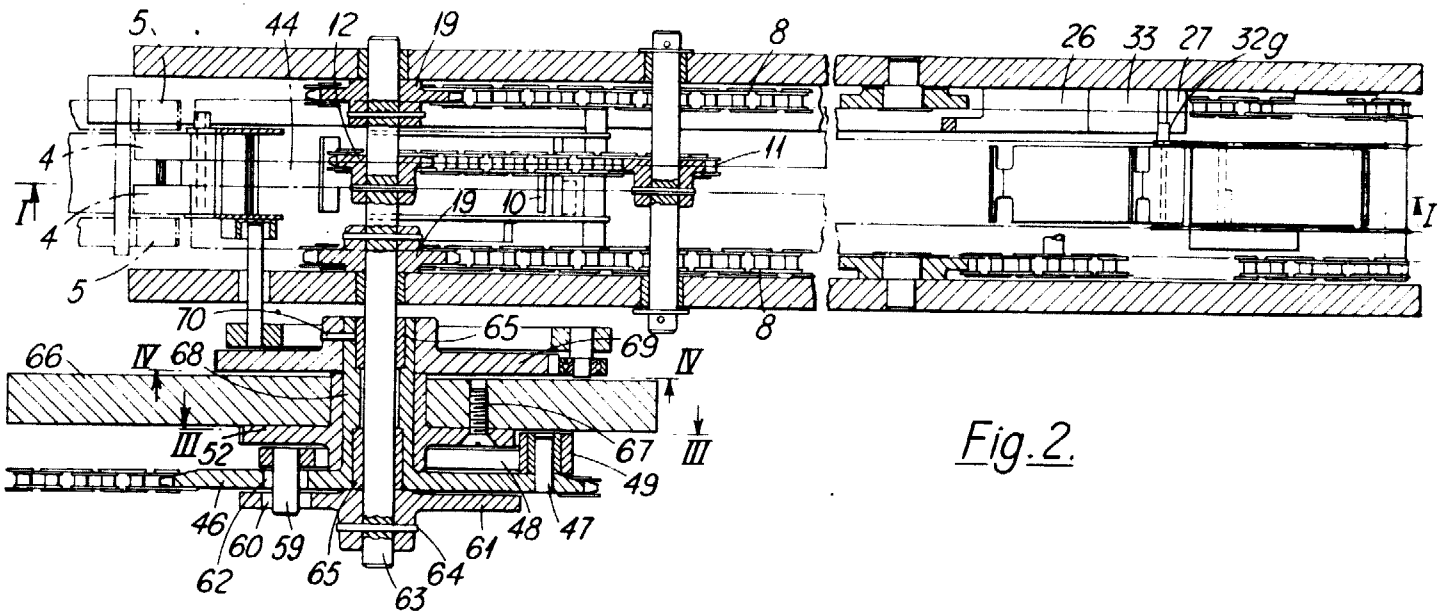
FIG. 2 is a sectional view taken on the line II—II of FIG. 1.

Thus, the lower pin 30g disposed farthest from the pintle 17g extends laterally outwardly at 32g (as shown in FIG. 2), to engage on the various guide members 21, 24, 25, 26 and 27.

In order to ensure that the pin extension 32g follows the correct downwardly inclined path at the right hand end of its motion, i.e. that the pin extension 32g rides in contact with or at least adjacent to the sloping end guide 26 even when travelling at considerably high speed, an upper downwardly deflecting guide member 33 is positioned above the sloping guide end 26 to ensure that there will be no tendency for the pin extension 32g to flap aimlessly in the vertical direction.

Figure 4:
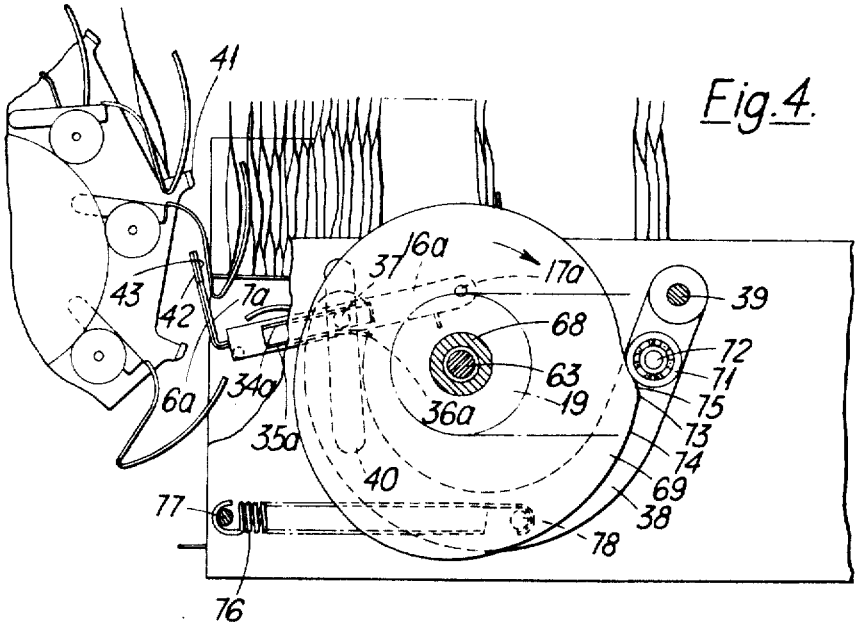
FIG. 4 is a section taken on the line IV—IV of FIG. 2.

As shown in FIG. 1, the lower run of the conveyor chains 8 is inclined upwardly towards the left whereas the lower guide member 21 is horizontal and is thus divergent away from the chain. Clearly therefore the arms 19 will, despite the presence of the guide 21, undergo a gentle anti-clockwise motion (as considered with reference to FIG. 1) when approaching the lefthand end of the guide 21 until the ends of the associated pintle 17m begin to ride upwardly around the lefthand sprocket 19. During such upward motion of the pintle 17m the extension 32m of the pin 30m will move leftwardly along the lower guide 21 to reach its extreme leftmost position after which, upon further upward movement of pintle 17m, the pin extension 32m will be dragged rightwardly along the guide 21. As shown in FIG. 4, one of the pair of arms 16 (which is here considered in the 16a position) is provided with a pair of guide strips the upper strip 34a of which is straight and extends parallel to the axis of the associated arm 16a, and the lower strip 35a is provided at its end nearest the pintle 17a with a downwardly curved end portion 36a.

A pin 37 is provided for reciprocating motion in a substantially vertical path as a result of oscillatory pivoting motion of a lever 38 about its pivot 39. As the arm is pulled upwardly during passage of the pintle 17 around the lefthand sprocket 19, the guide strips 34a and 35a are pulled upwardly to enclose the pin 37 between the funnel arrangement provided by the arcuate end 36 of strip 35a and the adjacent end of the upper strip 34a. The pin 37 is thus located within a slot formed by the strips 34a and 35a and extending longitudinally of the associated arm 16, as shown in FIG. 4. The engagement of the pin 37 with the associated slot of the arm 16 takes place while the pin 37 is at its lowest position at the bottom of a slot 40 in the machine frame. Then, while the pintle 17 ascends dragging the arm 16a upwardly, the pin 37 executes a rapid upward movement carrying the arm 16 therewith by virtue of the engagement between the upper strip 34a and the pin 37. At about this instant the main conveyor chains 8 will execute their cyclic reversal, by virtue of the mechanism shown in FIG. 3 and to be described shortly, so that the pintle 17 will instantaneously be travelling in the anti-clockwise sense around the axis of sprocket 19. The combination of the upward kick imparted to the strip 34a and the substantially simultaneous arresting and slight reversal of the pintle 17 causes the two closely spaced fingers 6 and 7 to move rapidly upwardly to clear the leftwardly projecting ends of the extracting fingers 4. This upward motion must be timed to coincide with the appropriate positioning of the star wheel 1 in the configuration shown in FIGS. 1 and 4, so that the closed fingers 6 and 7 are able to commence their rightward motion behind the last deposited bag before the descending anvil 41 of the continuously rotating star wheel 1 descends to cross the path of motion of the fingers.

Although not clearly illustrated in FIGS. 1 and 4, the lateral extent of the fingers 6 and 7 is greatest at an upper end portion 42 and 43 thereof but is less than the spacing between adjacent wing members 5 of the star wheel. Thus the descending wing member 5, shown just depositing a bag in FIG. 4, is clear of the rising wide finger portions 42 and 43 of fingers 6a and 7a.

Moreover, the remainder of the fingers below the upper portions 42 and 43 is of even smaller lateral extent so that the narrow portions may pass rightwardly along the floor of the channel 3 engaging snugly in a slot 44 extending the length of the channel. The vertical extent of the wider finger portions 42 and 43 is carefully related to the remaining dimensions and path of movement of the fiingers 6 and 7 so that the lower edges of the wide portions 42 and 43 may just clear the left hand ends of the extractor fingers 4 during circulation of the fingers.

Turning now to FIG. 3 which shows the mechanism for providing intermittent motion of the conveyor chains 8, it will be seen that the drive for this mechanism, in common with the drive to the conveyor chain 11 and the oscillating lever 38 is derived by way of a drive chain referenced 45 and driven from the main shaft of the star wheel. The chain drive between the star wheel and the various rotating members of the tea bag spacing device is important since this provides the appropriate timing of the retardation and upward pivoting of the fingers 6 and 7 to coincide with a space between successive anvils 41 at the extraction fingers 4.

The chain 45 engages teeth on the periphery of a sprocket 46 which rotates in the anti-clockwise direction as indicated by the arrow. The sprocket 46 carries a pin 47 to which an arcuate arm 48 is pivotally attached by way of sleeve 49 journaled to the pin 47. The arm 48 also carries a stub shaft 50 which has cam follower roller 51 mounted thereon by a roller bearing. The cam follower roller 51 rolls along the outer periphery of a stationary cam 52 which has a substantially circular periphery interrupted only by a lobe 53 which constitutes a steep ramp portion 54 and a shallow ramp portion 55 along which the cam follower roller 51 must roll during motion of the sprocket 46 relative to the cam.

The free end of the arm 48 is resiliently secured to the sprocket by means of a helical tension spring 56 extending between a hole 57 in the sprocket and a similar hole 58 in the free end of the arm. Thus the arm is perpetually biased towards the anti-clockwise direction of pivoting. The arm 48 carries, near its free end, a pin 59 extending parallel to pivot pin 47 and passing into a short radially extending slot 60 in a driven wheel 61. Since the sprocket 46 is positioned between the arm 48 and the driven wheel 61 a suitable circular aperture 62 is provided in the sprocket to permit the pin 59 to move freely during pivoting motion of the arm 48 relative to the sprocket.

In operation of the device shown in FIG. 3, the sprocket 46 rotates continuously in the anti-clockwise direction and the cam follower roller 50 thus rides around the substantially circular periphery of the cam 52 until it arrives at the steep ramp 54 at which it passes and causes the arm 48 to undergo a rapid spring-assisted pivoting motion in the clockwise direction relative to the sprocket 46. The difference between the radii of the paths of stub shaft 50 and pin 59 about the pivot pin 47 causes the pin 59 to undergo a considerable arcuate movement in the clockwise direction relative to the sprocket 46 and will thereby carry the driven wheel 61 in the clockwise direction relative to the sprocket which is itself rotating in the anti-clockwise sense. This causes the cam follower roller 51 to ride up over the lobe 53 and to commence to ride down the ramp 55 to accelerate the driven wheel once more to attain the mean rotational velocity of the sprocket 46.

The existence of the radially extending slot 60 in the driven wheel serves to compensate for the fact that the lever 48 is pivoting about the pin 47 which is considerably spaced from the axis of the sprocket 46. Thus, upon pivoting motion of the lever 48, the pin 59 will move slightly towards and away from the axis of the sprocket.

As shown in FIG. 2, the driven wheel 61 is secured to a main conveyor drive shaft 63 by means of a pin 64, and the main drive shaft also carries the two driving sprockets 19 for the chains 8 and the driving sprocket 12 for the chain 11, the sprockets 19 and 12 each being pinned to the shaft.

Clearly therefore the chains 8 and 11 will execute synchronised intermittent circulating motions about their respective sprockets, the difference in speeds between the upper runs of the conveyors 8 and 11 being achieved by ensuring that the sprockets 19 have a diameter greater than the diameter of sprocket 12. The sectional view of FIG. 2 shows clearly an abutment bar 10 extending laterally of the chain 11.

The sprocket 48 is freely rotatable with respect to the main drive shaft 63 by virtue of its being mounted on the shaft by way of two bushes 65. Moreover, FIG. 2 shows clearly that the cam 52 is fixed with respect to the machine frame 66 by means of a countersunk screw 67, two further similar screws being shown in FIG. 3. The two bushes 65 are mounted within a collar 68 integrally formed with the sprocket 46, and the free end of the collar carries a rotatable cam 69 secured thereto by means of a pin 70. The cam 69 forms a part of the machanism shown in FIG. 4 and serving to actuate the lever 38 to produce vertical reciprocating motion of the pin 37.

The operation of the cam 69 and lever 38 will now be described. The lever 38 is of arcuate form and is similar to the previously described lever 48 of the intermittent drive mechanism and carries a similar cam follower roller 71 mounted by way of a roller bearing on a stub shaft 72 integrally formed with the lever. The cam 69 is again formed with a substantially circular periphery but provided with a lobe 73 which in this case is preceded by a very gentle ramp 74 and is followed by a steeper ramp 75.

In this mechanism the lever 38 is biased in the clockwise direction by means of a helical tension spring 76 extending between a stud 77 on the machine frame and a similar stud 78 helically formed with the lever.

During operation of the counting apparatus, the cam 69 is driven for continuous rotation in the clockwise direction, as shown by the arrow in FIG. 4, by virtue of the connection afforded by the pin 70 between cam 69 and sleeve portion 68 of the sprocket. The cam follower roller 71 rides up the gentle ramp 74 to bring the reciprocating pin 37 gradually down to its lowest position. Then as the roller 71 rides over the lobe 73 and onto the steeper downwardly extending ramp 75, the lever 38 is free to pivot in the clockwise direction under the action of the tension spring 76 and thus the peg 37 executes a rapid upward displacement carrying with it the arm 16a by virtue of the abutment strips 34a and 35a which have already been positioned on either side of the peg 37 as explained above. Once the pin 37 attains its uppermost position, i.e. the cam follower roller 71 has reached the bottom of the ramp 75, the roller commences ascent of the very gentle ramp 74 which extends around substantially the entire circumference of the cam 69.

An alternative construction of cam 69 will be one in which the circumference is substantially circular and concentric with the axis of rotation of the main drive shaft 63, and then the downward ramp 75 is of extremely short peripheral extent as is also the more shallow upward ramp portion which carries the roller from the foot of the ramp 75 back to the circular portion of the cam periphery, gently but nevertheless much more rapidly than in the construction illustrated.

As explained above the timing of the movement of pin 37 and the retardation and reversal of the driven wheel 61 and main drive shaft 63 is arranged so that the momentary pause in the movement of the conveyor chains 8 coincides with the rapid upward "kick" imparted by the ascending pin 37 abutting the strip 34a. Clearly, once the various dimensions of the components of the apparatus have been decided, the precise timing is controlled by the angular orientation of the movable cam 69 with respect to the sprocket sleeve 68 to which it is pinned at 70. It may therefore prove desirable to replace the pin 70 by some other suitable locking mechanism which permits relative angular adjustment between the sleeve 68 and cam 69 so that fine adjustments to the machine timing may be made.

Figure 5:
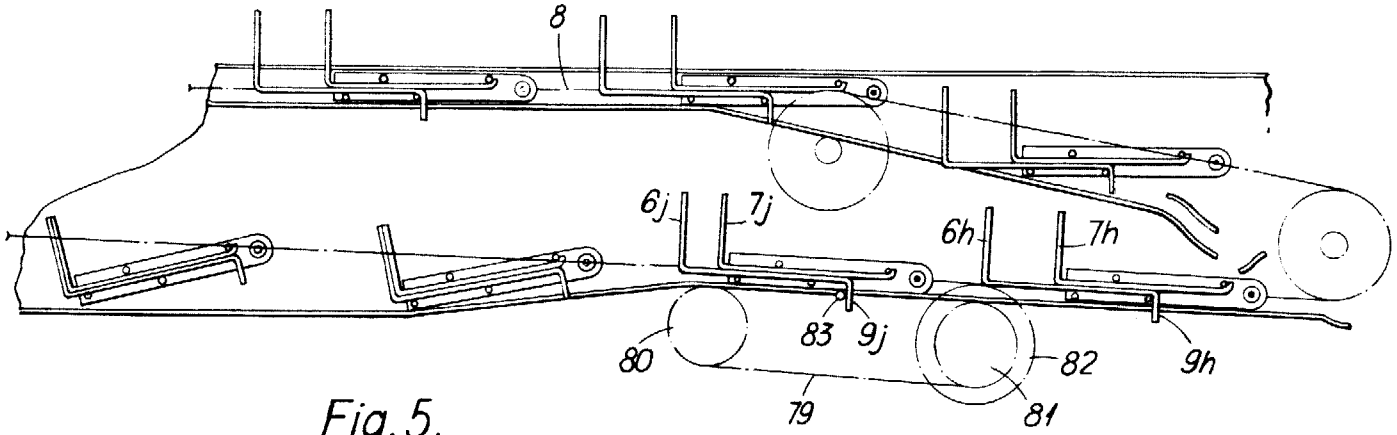
FIG. 5 is a view similar to FIG. 1 but showing a modified form of closing mechanism for the spacing fingers.

As suggested above, an alternative form of finger closing mechanism is shown in FIG. 5 as comprising a pair of conveyor chains 79 passing about sprockets on a pair of spaced shafts. One pair of sprockets 80 is freely rotatably mounted on one shaft while the other pair of sprockets 81 is mounted on a shaft which is driven by means of a chain wheel 82 engaging with one of the main conveyor chains 8. As the diameter of chain wheel 82 is greater than that of the sprockets 81 the linear speed of a bar 83 extending between the chains 79 will always be less than that of the pintles 17 etxending between the main chains 8.

The bar 83 is arranged so as to block the tabs 9 of the passing fingers 6, with the result that as the fingers 7 overtake the bar 83 the relatively movable fingers 6 are retarded until they reach the fully closed position in which the fingers 6 and 7 are substantially in contact with one another.

The abovedescribed and illustrated apparatus arranges the bags into groups of a predetermined number controlled by the ratio of the spacing between the pintles 17 to the mean bag thickness. As the counted groups of bags move along the channel 3 towards the righthand end of the apparatus shown in FIG. 1, a suitable packaging system may be employed to enclose each group of bags in an associated cardboard box or other package. For example, a cardboard box may be placed over the groups of bags which may, if desired, previously have been enclosed in a paper wrapper. Alternatively, a heat shrinkable plastics film may be enclosed around the group of bags and subsequently folded and sealed to provide a tidy package.

I claim:

1. A counting mechanism comprising:

(a) frame means, (b) *a substantially horizontally extended* guide [means] supported on said frame means for carrying articles to be counted and having an input end and a discharge end, (c) means for feeding *onto* [to] said guide a plurality of articles to be counted *to pass along said guide in an upstanding configuration,*

(d) a plurality of pairs of spacer fingers [movable along said guide], (e) *means sychronised with said feed means for driving said spacer fingers along and above said guide from said input end to said discharge end and along and below said guide from said discharge end to said input end,*

(f) *means for urging said spacer fingers upwardly from below to above said guide at said input end, and*

(g) means for effecting relative movement between the fingers of each pair to define groups of articles travelling along said guide [means], said movement effecting means comprising means for driving a first finger of each pair at a predetermined speed and further means for moving the second finger of each pair with respect to the said first finger of the same pair.

2. A counting mechanism as set forth in claim 1, wherein said further means effects movement of the said second fingers away from the first fingers.

3. A counting mechanism as set forth in claim 1, wherein the first mentioned finger driving means comprises a first conveyor carrying a plurality of said first fingers with said second fingers slidably mounted on said first fingers, said further finger moving means comprises at least one bar and a second conveyor carrying said at least one bar for movement along the direction of the guide at a velocity less than that of said first conveyor, and wherein said second finger of each pair is provided with abutment surfaces which engage the bar for retarding the said second finger and effect separating movement between the said first and second fingers of each pair.

4. A counting mechanism as set forth in claim 3, and including a plurality of pintles carried by said first conveyor, and a pair of arms pivotally attached to each said pintle and having said second fingers mounted therebetween.

5. A counting mechanism as set forth in claim 4, and including peg means on said arms projecting laterally thereof and guide means on said frame means for slidably engaging said peg means for controlling the angular orientation of the arms during movement along the upper and lower runs of said first conveyor.

6. A counting mechanism as set forth in claim 4, wherein the fingers are each in the form of L-shaped plates slidably interconnected in pairs, and wherein friction pins are carried between said arms to extend across the gap between the arms, said slidably interconnected L-shaped fingers of the pair being bowed between said friction pins.

7. A counting mechanism as set forth in claim 6, and including means for driving said first and second conveyors to execute an intermittent motion including regularly occurring retardations [and means for pivoting said L-shaped fingers upwardly while at said input end of said guide], *said means for urging said spacer fingers upwardly being synchronized to operate* simultaneously with a retardation of the conveyors.

8. A counting mechanism as set forth in claim 7, wherein said guide [means] comprises a guide channel having a floor and at least one side wall, the floor is provided with a longitudinally extending slot and said fingers each comprise upper portions wider than said slot and integrally formed with lower portions narrower than said slot.

9. A counting mechanism as set forth in claim 7, wherein said conveyor drive means includes a continuously rotating driving member and a periodically reversing driven member, and said finger pivoting means comprises a reciprocating member positioned for engaging said fingers for lifting them upwardly past said input end of the guide [means] during reverse movement of said article advancing fingers.

10. A counting mechanism as set forth in claim 9, wherein said driving and driven members are coaxial, said conveyor drive means including (a) a stationary cam having a substantially circular periphery, (b) a sharp lobe on said cam interrupting said periphery, (c) a pivotally movable arm carried by said driving member, (d) a pin carried by said arm, (e) slot means in said driven member and snugly receiving said pin, (f) a cam follower roller carried by said arm and arranged to roll along said periphery of said stationary cam whereby during rolling movement of the cam follower roller the arm is caused to undergo sudden pivoting in a direction to retard said driven member and impart thereto an irregular motion during continuous motion of said driving member.

11. A counting mechanism as set forth in claim 9, wherein the said reciprocating member comprises a pin and said reciprocating pin is driven by a reciprocating mechanism including (g) a rotatable cam having a peripherally disposed cam surface, (h) a lever pivotally mounted on said frame means and carrying said reciprocating pin, (j) a cam follower roller on said lever arranged to ride along said peripherally disposed cam surface, (k) means resiliently biasing said lever for movement in a direction holding the cam follower roller in contact with the cam surface, and (l) an indented lobe in the cam surface, whereby the cam follower roller enters the indented lobe under the action of said biasing means and thereby causes the lever to pivot in a sense corresponding to upward movement of the reciprocating pin.

12. A counting mechanism as set forth in claim 11, and including a pair of abutment strips carried by the fingers and defining a parallel-sided slot having at one end a funnel-shaped opening for receiving said reciprocating pin when said pin is in its lowest position and said fingers are below said input end of the guide [means].

13. A counting mechanism as set forth in claim 11, and including a collar carrying said rotatable cam and secured to said driving member of the conveyor drive means.

14. A counting mechanism as set forth in claim 1, and including spring detent means arranged abuttingly to urge said second finger of said at least one pair back towards the said first finger during return of the fingers towards said input end of the guide [means].

15. A counting mechanism as set forth in claim 1, and including conveyor means arranged parallel and adjacent to said closed path moving at a speed slower than that of the fingers and along said closed path, and at least one pin carried by said conveyor means for retarding abutting engagement with said second finger of said at least one pair.

References Cited

The following references, cited by the Examiner, are of record in the patented file of this patent or the original patent.

UNITED STATES PATENTS

| | | | |
|---|---|---|---|
| 3,019,886 | 2/1962 | Winkler | 93—93 DP |
| 3,417,540 | 12/1968 | Copping | 53—48 |

RICHARD AEGERTER, Primary Examiner

U.S. Cl. X.R.

93—93 DP